(No Model.) 3 Sheets—Sheet 1.

F. GALPIN.
ROTARY STEAM ENGINE.

No. 605,564. Patented June 14, 1898.

Witnesses:
W. J. Jacker.
H. M. Richards.

Inventor:
Frederic Galpin,
By W. B. Richards,
Atty.

(No Model.) 3 Sheets—Sheet 2.

F. GALPIN.
ROTARY STEAM ENGINE.

No. 605,564. Patented June 14, 1898.

Witnesses:
R. J. Jacker.
H. M. Richards.

Inventor:
Frederic Galpin,
By W. B. Richards,
Atty.

(No Model.) 3 Sheets—Sheet 3.
F. GALPIN.
ROTARY STEAM ENGINE.
No. 605,564. Patented June 14, 1898.
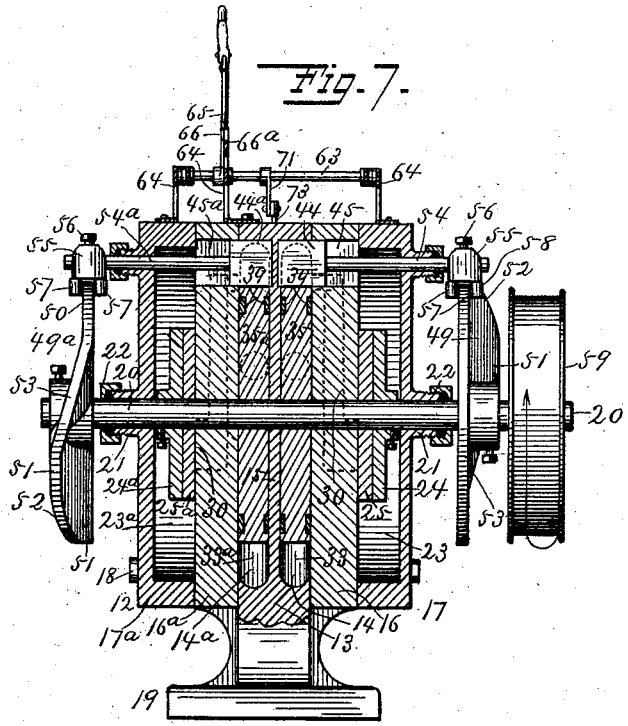
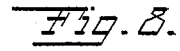
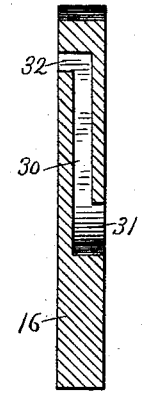
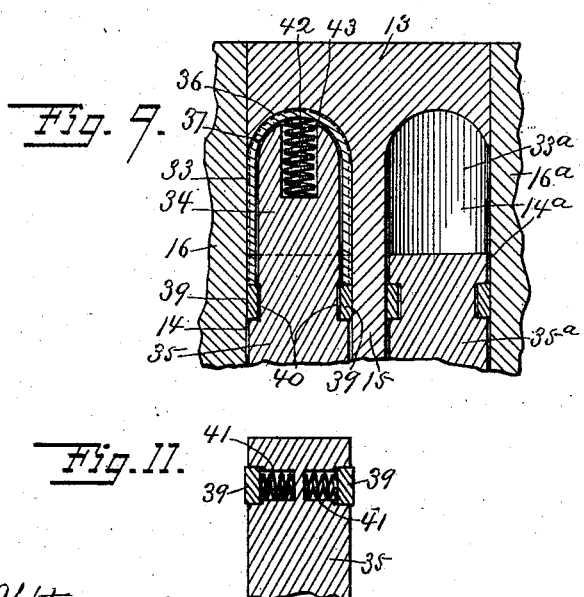
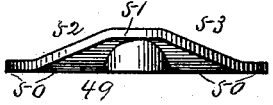
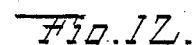
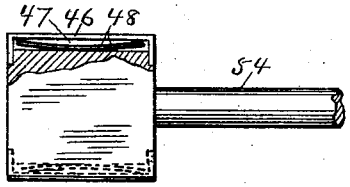
Witnesses:
W. J. Jacker.
H. M. Richards.
Inventor:
Frederic Galpin,
By W. B. Richards
Atty.

UNITED STATES PATENT OFFICE.

FREDERIC GALPIN, OF WILLIAMSFIELD, ILLINOIS.

ROTARY STEAM-ENGINE.

SPECIFICATION forming part of Letters Patent No. 605,564, dated June 14, 1898.

Application filed September 28, 1897. Serial No. 653,367. (No model.)

*To all whom it may concern:*

Be it known that I, FREDERIC GALPIN, a citizen of the United States, residing at Williamsfield, in the county of Knox and State of Illinois, have invented certain new and useful Improvements in Rotary Steam-Engines, of which the following is a specification.

This invention relates to rotary engines.

The leading objects of the invention are to provide a rotary engine of simple construction which at the same time embodies many advantages; to provide novel means whereby the direction of circular motion of the piston may be reversed; to provide novel means for using the steam expansively, and to provide novel means for admitting and controlling the passage of steam to the piston-cylinder.

Other objects of the invention are hereinafter described.

To the end of carrying out these various objects the invention consists in novel constructions, arrangements, and combinations of parts hereinafter described, and made the subject-matter of claims forming part of this specification.

Mechanism embodying the structural peculiarities of the different parts, the novel organization and arrangement of said parts, and the novel combinations thereof, which form the subject-matter of the claims herewith, is illustrated in the accompanying drawings, in which—

Figure 1:
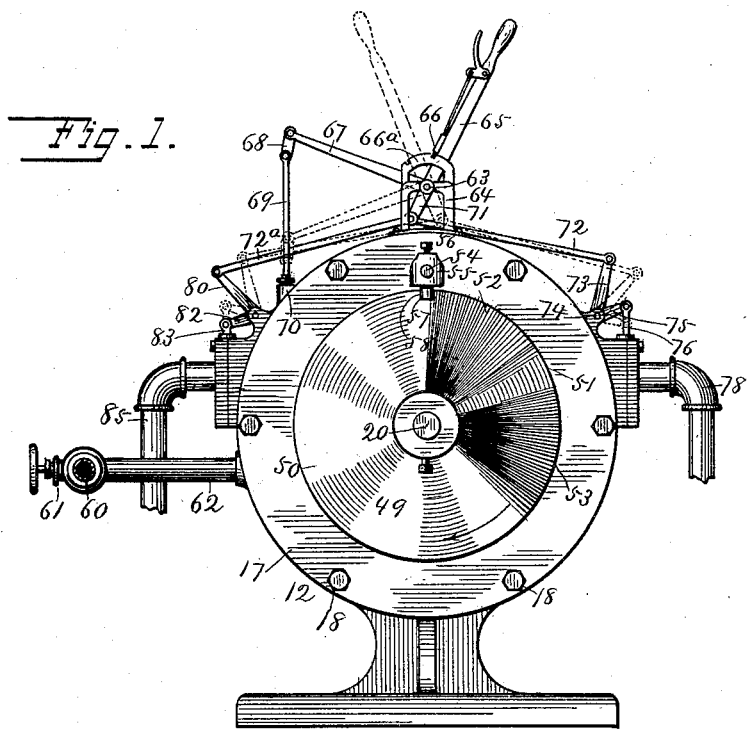
Figure 2:
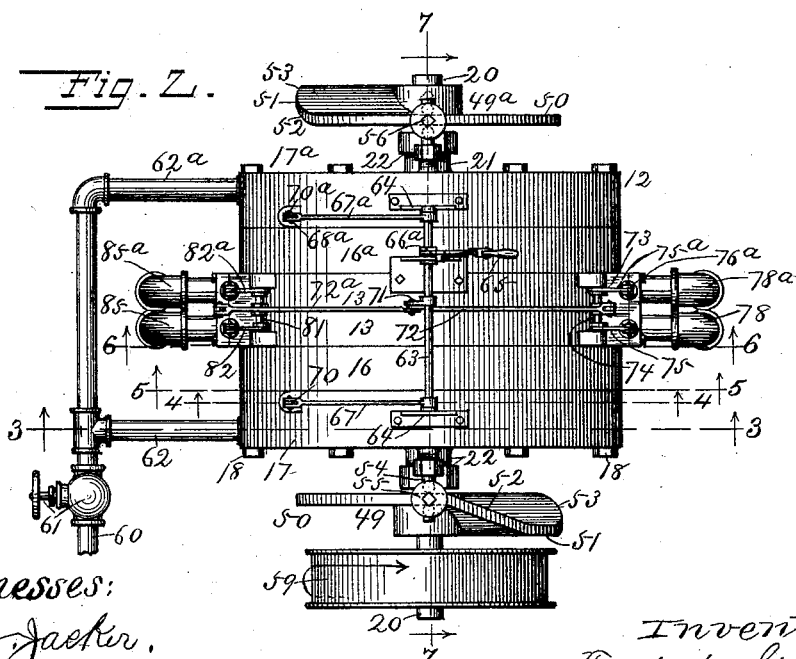
Figure 3:
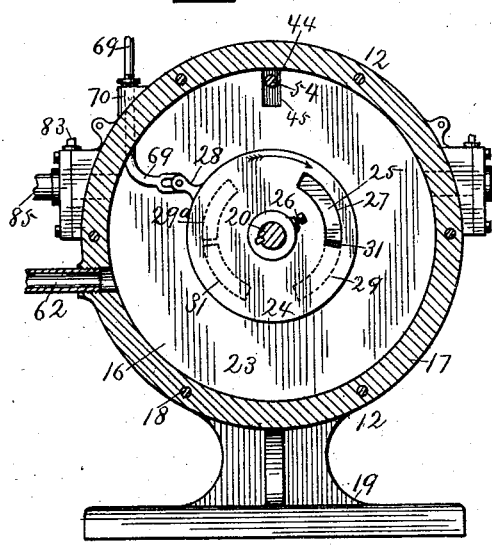
Figure 4:
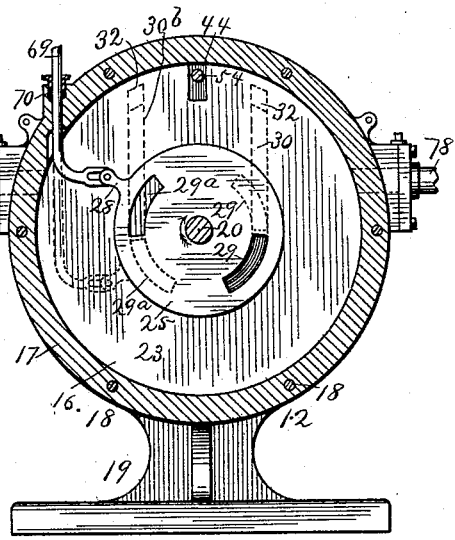
Figure 5:
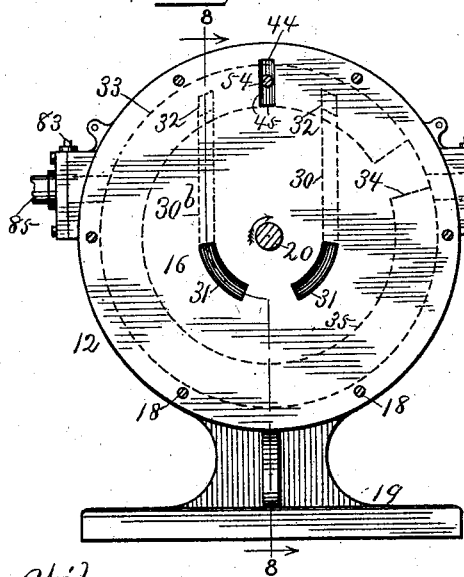
Figure 6:
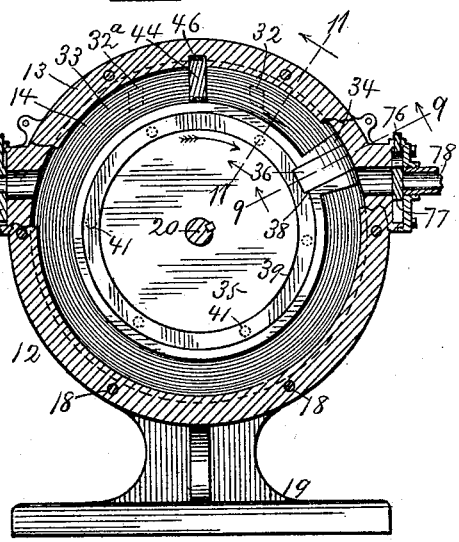

Figure 1 is an end elevation of a rotary engine embodying my improvements; Fig. 2, a top plan without the pulley shown at Fig. 1; Fig. 3, a sectional elevation in the line 3 3 in Fig. 2; Fig. 4, a sectional elevation in the line 4 4 in Fig. 2; Fig. 5, an elevation in the plane of the line 5 5 in Fig. 2 and between two of the sections of which the cylindrical casing is composed; Fig. 6, an elevation in the line 6 6 in Fig. 2 and between two of the sections of which the cylindrical casing is composed. This figure is partly broken away to show exhaust-ports in section. Fig. 7 is a sectional elevation in the line 7 7 in Fig. 2; Fig. 8, a sectional elevation of one of the cylinder-heads in the line 8 8 in Fig. 5; Fig. 9, an enlarged sectional plan in the line 9 9 in Fig. 6, showing one of the pistons and its packing and other adjacent parts; Fig. 10, a plan of one of the cams seen edgewise of itself and with its cam edge to the front; Fig. 11, an enlarged sectional elevation of a fragmental part of the outer portion of the piston-carrying wheel in the line 11 11 in Fig. 6; Fig. 12, an enlarged side elevation of one of the abutments, partly broken away to show its packing.

The entire cylindrical casing (designated by the numeral 12) is formed of separable sections, as follows: a central part or section 13, having twin circular cavities 14 14$^a$ in its opposite sides, and an intermediate cylinder-head 15 between said steam-cylinders; twin sections or heads 16 16$^a$, the head 16 contiguous to and on one side of the section 13 and the head 16$^a$ on its other side and contiguous thereto, and twin sections or valve-chamber sections 17 17$^a$, the section 17 contiguous to and on one side of the head 16 and the section 17$^a$ contiguous to and on one side of the head 16$^a$. The sections of the casings recited are fixed to each other by through-bolts 18, and a part of them are integral with or may be otherwise fixed to the base or support 19, whereby the entire casing 12 will be supported thereon. By loosening the nuts on the bolts 18 any of the sections of the casing may be separated for access to the contained operative parts.

The shaft 20 extends centrally through and is free to rotate in all of the sections of the casing 12 and is supported mainly by the bearings 21 in the heads of the sections 17 17$^a$, where suitable packing-boxes 22 are provided. Other packing may be provided, if desired, where this shaft passes through other sections of the casing. The chamber-sections 17 17$^a$ are each chambered out to form suitable valve-chambers 23 23$^a$. Within the valve-chamber 23 are located valves 24 and 25, (see Fig. 7,) and in the chamber 23$^a$ are located valves 24$^a$ 25$^a$ of the same construction. The valves 24 24$^a$ are fixed to rotate with the shaft 20 by set-screws 26 or otherwise, and each has an arc-shaped slot 27 therethrough, (see Fig. 3,) which curved slots are concentric with the axis of said shaft. The valves 25 25$^a$ are loosely mounted on the shaft 20, and each has an arm 28 projecting radially therefrom (see Fig. 4) and has two diametrically opposite arc-shaped slots 29 29$^a$ therethrough, which slots are concentric with the axis of the shaft 20 and register with the slot 27 in the adjacent valve 24 when radially coincident therewith.

The cylinder-heads 16 16$^a$ (see Figs. 5 and 8)

each have steam-passages 30 30ᵇ therethrough, one end 31 of which opens at that side of each cylinder-head which is adjacent to the valve 25 or 25ᵃ, as the case may be, and in such position as to register with the slots 29 or 29ᵃ, and the other end 32 of which opens into the annular spaces or steam-cylinders 33 33ᵃ, in which the pistons revolve, which are hereinafter described.

The wheel 35 carries a piston 34, projecting radially from its periphery, (see Fig. 6,) and the wheel 35ᵃ carries the same construction of piston. (Not shown.) Each of said wheels is keyed or otherwise fixed to the shaft 20, so that as the pistons are revolved or forced around in their orbital paths in the annular chambers 33 33ᵃ by the pressure of the steam or other motive force exerted circumferentially thereon the shaft 20 will be rotated thereby. The annular chambers or steam-cylinders 33 33ᵃ are those parts of the circular cavities 14 14ᵃ which are between the wheels 35 35ᵃ and the outer walls of the cavities 14 14ᵃ on their outer and inner sides and the heads 15 and 16 16ᵃ on their other sides. These annular chambers have the functions of cylinders, and hence I have herein termed them "steam-cylinders."

The outer ends of the pistons are of curved form or arc-shaped in their axial sections (see Figs. 7 and 9) and the confronting faces of the respective steam-cylinders in which they operate are of corresponding forms, whereby an effective packing may be introduced between the pistons and their respective casings, as follows: A spring 36, bent at its mid-length part, is seated in a groove 37 in the piston, which extends over the curved part of the piston and thence along its sides and into the wheel 35. The spring 36 extends the length of the groove 37, and its ends rest in notches 38 in packing-plates 39, which are seated in annular grooves 40, one of which is located in each side of each one of the wheels 35 35ᵃ, and which plates 39 are held slightly beyond the surface of the wheel 35 by a plurality of springs 41. (See Fig. 11.) The straight end portions of each spring 36 are held outward slightly beyond the surface of the sides of the piston by their resiliency (see Fig. 9) to serve as packing, and its central curved part is held outward slightly beyond the curved part of the piston for the same purpose by a spring 42, which is seated in a recess 43 in the outer end part of said piston. There are two slidable steam or other motive-agent abutments, one, 44, adapted to slide into and as a valve close the annular steam cylinder or passage 33 and the other, 44ᵃ, adapted to similarly close the steam-passage 33ᵃ. The abutment 44 is drawn backwardly into a recess 45 in the head 16 to open the steam-passage 33 and permit the piston 34 to pass, and the abutment 44ᵃ is drawn backwardly into a recess 45ᵃ in the head 16ᵃ to open the steam cylinder or passage 33ᵃ for the same purpose. The abutments 44 44ᵃ are made steam-tight at their edges by means of packing-plates 46, (see Fig. 12,) which are each seated in a groove 47 in the edge of the abutment, and its ends, bent at right angles to its main portion, are slidably seated in grooves in the ends of the abutment. A curved spring 48, seated in the groove 47 beneath the plate 46, serves to force said plate outwardly, so that its outer side projects slightly beyond the side of the abutment when the abutment is in place for operation, and thus effects a steam-tight fitting with the adjacent surfaces.

A cam-wheel or disk 49 is fixed to the shaft 20 at one side of the casing 12, and a similar cam-wheel 49ᵃ is fixed to said shaft at the other side of the casing. Each cam-wheel or disk has a greater portion 50 of its peripheral part in a plane at right angles to the axis of the wheel, and a small part 51 of its peripheral part is also in a plane at right angles to the axis of the cam-wheel or disk, but at such distance farther outward on said wheel than the part 50 as equals the travel of the abutments, while the part 50 is at its opposite edges connected with the part 51 by parts 52 and 53, inclined or oblique in opposite directions to the axis of the cam-wheel. A valve-stem or abutment-stem 54 is connected at one of its ends with each abutment and, projecting outward through suitable packing in the outer wall of the valve-chamber section 17, carries a head 55, adjustably mounted on its outer end and held after such adjustments by means of a set-screw 56. The head 55 is provided with two pendent pins 57, on which are journaled antifriction-rollers 58, between which is the raceway for the adjacent cam-wheel or disk. A pulley 59 is shown on one end of the shaft 20 for transmitting motion from said shaft to any desired mechanism. Other means may be used for the same purpose.

A pipe 60, leading from any suitable supply of steam or other motive agent, is provided with a throttle-valve 61 and is connected between the valve 61 and the engine by a pipe 62 with the valve-chamber 23 and by a pipe 62ᵃ with the valve-chamber 23ᵃ.

A rock-shaft 63, journaled in bearings 64 on the casing 12, (see Figs. 1, 2, and 7,) carries a hand-lever 65, by which it is operated, said hand-lever being provided with a dog 66, which engages with a curved rack-bar 66ᵃ to lock the lever and rock-shaft as desired. A radius-arm 67 projects from the rock-shaft 63 and is pivotally connected at its outer end by a shorter link 68 with a longer link 69, which passes through a packing-box 70 in the section 17 and thence into the valve-chamber 23, where its slotted end is pivotally connected with the outer end of the arm 28, (see Fig. 4,) which projects radially from the valve 25. A similar radius-arm 67ᵃ projects from the rock-shaft 63 and is pivotally connected at its outer end by a shorter link 68ᵃ with a longer link, (not shown,) which passes through a packing-box 70ᵃ in the section 17ᵃ, and thence into the valve-chamber 23$^a$, where its slotted end is pivotally connected with the outer end of an arm, (not shown,) but projecting from the valve 25$^a$ in same manner as the arm 28 projects from the valve 25. A short radius-arm 71 depends from the rock-shaft 63 and is pivotally connected at its free end with one end of a link 72, the other end of which link is pivotally connected with the outer end of a short radius-arm 73, which projects from a rock-shaft 74, journaled in suitable bearings on the section 13. Other radius-arms 75 and 75$^a$ project from the rock-shaft 74 and are pivotally connected, the arm 75 by a link 76 with an ordinary slide-valve 77 in the exhaust-pipe 78, which enters the steam-cylinder 33, and the radius-arm 75$^a$ by a link 76$^a$ with a similar slide-valve (not shown) in the exhaust-pipe 78$^a$, which enters the steam-cylinder 33$^a$. Another link 72$^a$ extends from the radius-arm 71 to the outer end of a radius-arm 80, which projects from a rock-shaft 81, that carries two radius-arms 82 82$^a$, which are connected, respectively, by links 83 83$^a$ with slide-valves 84 in the exhaust-pipes 85 85$^a$, (the slide in the exhaust-pipe 85$^a$ not being shown.) The exhaust-pipes 85 85$^a$ are at the opposite side of the engine from the exhaust-pipes 78 78$^a$.

The cam-wheel or disk 49, valve 24, and piston-carrying wheel 35, all of which are fixed to the shaft 20, are so fixed with their working parts in diametrically opposite positions from the working parts of the cam-wheel or disk 49$^a$, valve 24$^a$, and piston-carrying wheel 35$^a$, all of which are also fixed to said shaft—that is, the cam-wheel 49 is fixed with its parts 51 diametrically opposite the same part on the cam-wheel 49$^a$, the valve 24 with its steam-passage 25 diametrically opposite the same passage in the valve 24$^a$, and the piston-carrying wheel 35 with its piston diametrically opposite the piston of the wheel 35$^a$. By this means provision is made for revolving the pistons in either direction and for preventing dead-centers; but it will be understood that an effective engine without said advantages may be made with the parts 49, 24, and 35 and their respective connections without the counterpart parts 49$^a$, 24$^a$, and 35$^a$, and the same may be said of the parts 49$^a$, 24$^a$, and 35$^a$.

For running the engine direct or moving the pistons 34 34$^a$ clockwise, as indicated by the curved arrows, steam being turned on by opening the throttle-valve 61 will fill the chambers 23 23$^a$. The hand-lever 65 is then turned to and locked in the position shown by full lines at Fig. 1, thereby swinging the valves 25 25$^a$ into the positions shown of the valve 25 at Fig. 4. In this position the steam-passage 29 will begin to receive steam through the steam-passage 27 in the valve 24, and as the valve 24 rotates the passage 27 will be brought into full coincidence with the passage 29, through which the steam will pass to the throat 31 of the steam-conduit 30 in the cylinder-head 16, and passing through this conduit will be delivered into the steam-cylinder or annular steam-space 33 between the piston 34, which is in the position shown at Fig. 6, and the abutment 44, which is in the position shown at Fig. 7. This steam will exert its full pressure between the abutment and piston and will force the piston and shaft 20 around in the direction referred to, while the steam will act expansively as the distance between the abutment and piston increases. In swinging the hand-lever 65 as described the arms 73 75 are rocked into positions (see Fig. 6) to close the exhaust-ports 78 78$^a$ and at the same time to open the exhaust-ports 85 85$^a$, as shown at same figure. Hence when the piston passes the exhaust-port 85 the steam will be permitted to escape therethrough, when the steam acting on the other piston 34$^a$ will carry the piston 34 on and past the abutment 44, which has at the proper time been retracted for that purpose by the inclined cam part 53 of the cam-wheel 49 and held while the piston passes by the part 51 and is then immediately forced back to its position in the steam-space 33 by the inclined cam part 52 of said cam-wheel. Soon as the piston 34 passes the opening 32 of the steam-conduit 30 into the steam-space 33 steam will again be admitted in rear thereof and the same operation will be repeated.

The operation of the piston 34$^a$ in running, as above described, clockwise need not be herein described, as it will be evident from the foregoing description that in view of the fact that its abutment is operated in the same way and the steam is received in same way as the other piston and exhausted in the same way, but through the exhaust-port 85$^a$, it simply alternates with the piston 34 in its operations by reason of it being diametrically opposite thereto, as are all the other parts fixed to the shaft 20.

In starting the engine for direct movement of the piston, as described above, steam is turned on by opening the throttle-valve, when one or the other systems of valves, pistons, &c., may be in proper position to start properly; but if not so and pistons do not move then the hand-lever 65 can be turned slowly for reverse motion until the cam-wheel or disk comes into proper position for running direct, when by swinging the hand-lever into its full-line position described, and the pistons will be revolved by the steam clockwise, as already described.

For running the pistons and shaft 20 in a direction reverse to that described the hand-lever 65 is swung to the position shown by dot-lines at Fig. 1, thereby opening the exhaust-ports 78 78$^a$, closing the exhaust-ports 85 85$^a$, and swinging the valve 25 to the position shown by dot-lines at Fig. 4, in which position it will, when the passage 27 in the valve 24 coincides therewith, deliver steam to the mouth of the conduit 30$^b$, which will in turn deliver it to the other side of the abutment 44 from that side thereof to which it is delivered for revolving the piston clockwise and will, when so delivered, revolve it in a reverse or opposite direction. The starting may then be properly effected in substantially the same manner as in starting for direct running with only evident variations therefrom. The incline 52 of the cam-wheels 49 will, in revolving in a reverse direction, act to retract the abutments, and the inclines 53 will act to thrust them into the steam-space 33. These inclines 52 and 53 are such as to give the proper movements to the abutments, and the part 51 is of such length as to hold the abutments in their retracted positions merely while the pistons pass.

Although I have specifically described the structural peculiarities and relative arrangement of the several elements of my improved rotary engine, yet I do not desire to be confined to the same, as such changes or modifications may be made without departing from the scope of my invention as fairly fall within the scope thereof.

Having thus described my invention, what I claim as new, and desire to secure by Letters Patent, is—

1. In a rotary engine, and in combination, a rotatable shaft, a wheel fixed to said shaft, a piston on the periphery of said wheel, an annular steam-chamber in which said piston revolves, a slidable abutment, a cylinder-head with twin steam-supply conduits for said piston, exhaust-conduits for said annular steam-chamber, a valve with steam-passages loosely mounted on said shaft, a valve fixed to said shaft and provided with a steam-passage, and a steam-chamber in which said valves are located, substantially as described.

2. In a rotary engine, and in combination, a rotatable shaft, a wheel fixed to said shaft, a piston on the periphery of said wheel, an annular steam-chamber in which said piston revolves, a cylinder-head with twin steam-supply conduits 30, 30$^b$ therethrough for said piston, exhaust-conduits for said annular steam-chamber, valves 24 and 25, constructed and mounted substantially as described, and a steam-chamber in which said valves are located, substantially as described.

3. In a rotary engine, and in combination, a rotatable shaft, a wheel fixed to said shaft, a piston on the periphery of said wheel, an annular steam-chamber in which said piston revolves, a cylinder-head with steam-supply conduits 30, 30$^b$ therethrough for said piston, exhaust-conduits for said annular steam-chamber, a valve loosely mounted on said shaft and having steam-passages 29, 29$^a$, means for adjusting said valve, a valve fixed to said shaft and having a steam-passage 27, a steam-chamber in which said valves are located, and a valved steam-supply pipe leading to said chamber.

4. In a rotary engine, and in combination, a rotatable shaft, twin wheels fixed to said shaft, a piston on the periphery of each of said wheels, twin annular steam-chambers in which said pistons revolve, slidable abutments, means for operating said abutments, twin cylinder-heads each having steam-supply conduits 30, 30$^b$, twin valves loosely mounted on said shaft, and each having steam-passages therethrough, means for simultaneously adjusting said valves, and twin valves fixed to said shaft and each having a steam-passage therethrough, substantially as described.

5. In a rotary engine, and in combination, a rotatable shaft, twin wheels fixed to said shaft, a piston on the periphery of each of said wheels, twin annular steam chambers or cylinders, slidable abutments, means for actuating said abutments, twin cylinder-heads each having steam-conduits 30, 30$^b$, twin pairs of valves, 24, 25, mounted on said shaft, a hand actuating-lever for said valves, means for operatively connecting said valves 25 with said lever, exhaust-ports at each side of said annular steam chambers or cylinders, exhaust-valves for said exhaust-ports and means for operatively connecting said exhaust-valves with said lever, whereby said valves 24, 25 and exhaust-valves are simultaneously adjusted, substantially as described.

6. In a rotary engine, and in combination, a cylinder provided with exhaust-ports, a rotary shaft, a cylinder-head having steam-supply conduits 30, 30$^b$, a valve adjustably mounted on said shaft and provided with steam-passages 29, 29$^a$, a valve fixed to said shaft and provided with a steam-passage 27, substantially as and for the purpose described.

7. In a rotary engine and in combination, a cylinder provided in its periphery with an exhaust-port, a valve therefor, a rotary piston, a cylinder-head having therein a steam-supply conduit, a valve therefor secured to the shaft of said rotary piston, a second valve movable relative to said shaft, an operating-lever and connections for said second valve, and connections between said lever and said exhaust-valve whereby the valves are operated simultaneously, substantially as described.

8. In a rotary engine, and in combination, a cylinder having in the periphery thereof exhaust-ports, valves therefor, a rotary piston, a cylinder-head on one side of said rotary piston having steam-supply conduits therein, valves for said supply-conduits mounted on the shaft of said rotary piston, one fixed and the other loose thereon, a steam-chest surrounding said supply-valves, and means for operating said exhaust-valves and said loose valve, substantially as described.

In testimony whereof I affix my signature in presence of two witnesses.

FREDERIC GALPIN.

Witnesses:
JOSIAH TILDEN,
H. M. RICHARDS.